April 21, 1970   G. H. FREIER   3,507,503
RECORD PLAYER

Filed Sept. 25, 1967   8 Sheets-Sheet 1

Inventor
Gerald H. Freier
By Brown, Jackson, Bretteher & Diemer
Attys.

April 21, 1970           G. H. FREIER           3,507,503

RECORD PLAYER

Filed Sept. 25, 1967           8 Sheets-Sheet 2

Fig. 3.

Inventor
Gerald H. Freier
By Brown, Jackson, Boettcher & Dienner
Att'ys.

April 21, 1970  G. H. FREIER  3,507,503
RECORD PLAYER
Filed Sept. 25, 1967  8 Sheets-Sheet 6

Inventor
Gerald H. Freier
By Braun, Jackson, Boettcher & Diemer
Att'ys.

April 21, 1970      G. H. FREIER      3,507,503
RECORD PLAYER Filed Sept. 25, 1967      8 Sheets-Sheet 8

Inventor
Gerald H. Freier
By Brown, Jackson, Boettcher & Dienner
Att'ys.

United States Patent Office 3,507,503
Patented Apr. 21, 1970

3,507,503
RECORD PLAYER
Gerald H. Freier, Benton Harbor, Mich., assignor to V-M Corporation, Benton Harbor, Mich., a corporation of Michigan
Filed Sept. 25, 1967, Ser. No. 670,247
Int. Cl. G11b 17/08
U.S. Cl. 274—10                                    25 Claims

ABSTRACT OF THE DISCLOSURE

A record player in which the tone arm has a motor-driven record change cycling cam energized by an arm moving with the tone arm to trip a photocell in the cam motor circuit at the end of a record play. The cam operates linkage which first lifts the tone arm off the record and simultaneously clutches it to the tone arm, then moves the tone arm laterally to allow a record to be lowered to a sensing position over the turntable, and moves the tone arm back against the record edge to sense its size, the cam also operating a brake to temporarily halt the turntable while the record is being gently lowered the rest of the way to the turntable. Afterwards, the linkage sets the tone arm at the record edge as the turntable restarts and the cam motor shuts off. The cam also controls a further lever which shifts a plate on the trip arm so as to alter the position at which it trips the photocell in accordance with the size of record sensed. When the tone arm is moved inwardly toward the turntable center and fails to sense a record, it operates a gate causing the linkage to use an alternate path by which it moves the tone arm outwardly beyond the turntable and brings other levers into play which first lock the tone arm in said outward position to allow the cam to complete its rotation and return the linkage to its starting position and which levers then release the tone arm as the cam stops so that the tone arm may be lowered to a rest position on the player.

---

This invention relates to phonograph record player mechanisms and particularly to novel and improved means for controlling the movements of the tone arm during a record change cycle.

Thus, the present invention provides a phonograph record player with novel record changer mechanism which functions to first lift the tone arm off a record at the end of its play and move the tone arm out of the way in order to permit lowering a new record to the turntable, thereafter to locate the tone arm in the starting groove of the newly lowered record in order to resume playing and after the last record has been played to move the tone arm to a position of rest off the turntable in preparation to shut off the player.

A principal object of the invention is to provide record changer mechanism of the above character which is both efficient and effective in the performance of said functions and is also of a construction practical to manufacture.

A feature of a record changer mechanism constructed in accordance with the present invention is that it employs a single control cam which rotates through a full 360° in order to effect such functions, the single cam also controlling the sequential lowering of records one at a time to the player turntable wherefore the movements of the tone arm during a change cycle are automatically and accurately coordinated with the record lowering function of the player.

Another feature of the invention is that provision is had for automatically stopping rotation of the turntable prior to the actual depositing of a record on the turntable and restarting the turntable prior to the actual touchdown of the tone arm stylus in the starting groove of the deposited record.

Another feature of the invention is that provision is had for delaying lift off of the tone arm when playing smaller size records in order to accommodate the fact that intentionally the play groove in such records is brought closer to the center thereof than in larger diametered records.

A further feature of the invention is that the record change control mechanism includes means under control of rotation of the mentioned cam which first lifts the tone arm off the record as rotation of the cam is started at the end of record play, thereafter moves the tone arm outwardly so as to provide clearance for lowering the next record to the turntable, then brings the tone arm inwardly so as to sense the diameter of the record lowered and thereafter lowers the tone arm into the thus located starting grove of the record when deposited onto the turntable as the cam completes a full rotation.

In the preferred form of the invention each record is sensed by the inward movement of the tone arm before the record is deposited onto the turntable and the tone arm is backed off a controlled increment after sensing the record edge in order to permit depositing the record on the turntable, after which the tone arm is moved inwardly over the record a controlled increment which centers its stylus over the starting groove of the record and then the tone arm is lowered to the turntable.

A further feature of the invention is that said lateral movements of the tone arm are effected through a link or cam follower which is clutched to the tone arm and follows in a continuous track of the cam, the cam track being radially disposed relative to the center of rotation of the cam to effect said lateral movements of the tone arm.

It is a further feature of the invention that the cam follower is clutched to the tone arm only during the actual change cycle wherefore although the follower is held stationary by the stilled cam during record play the stylus of the tone arm is free to follow the record groove inwardly toward the record center as the record rotates with rotation of the turntable.

Additionally, and it is a further feature of the invention that, the cam track in which the link follows during a record change cycle with rotation of the cam includes a first radially out-turned portion which causes the tone arm to be moved by the cam follower and clutch laterally to a position outside the turntable and beyond the periphery of the largest diameter of record to be deposited onto the turntable, a concentric portion which holds the tone arm stationary as a record is lowered to a sensing position spaced over the turntable, a first radially inturned portion which causes the tone arm to be moved by the follower and clutch inwardly toward the center of the turntable until it has been brought into abutment with the record which has been lowered to the sensing position. In accordance with the invention, said first radially inturned portion of the cam track extends sufficiently close to the center of rotation of the cam as to allow the clutch and cam follower to bring the tone arm closer to the center of the turntable than is required to bring the tone arm into abutment with a record of the smallest diameter to be played on the player, the clutch slipping as the tone arm abuts a record edge so as to allow the follower to be moved by said portion of the cam track to the end thereof. The cam track further has a second and shorter radially out-turned portion which causes the clutch and cam follower to back the tone arm a controlled increment to provide clearance for the record to be lowered, a concentric portion which causes the clutch and follower to hold the tone arm in said backed position as the record is lowered the rest of the way to the turntable and a second radially inturned portion which causes the cam follower and clutch to move the tone arm again inwardly a controlled distance over the record sufficient that it centers the stylus of the tone arm over the starting groove of the lowered record.

Still another feature of the invention is the provision of an alternate or by-pass track portion which communicates with the main track at the inward end of its first inwardly turned track portion, said alternate or by-pass track portion being turned radially outward and merging into a concentric portion adjacent the outer periphery of the cam and thence into a portion which enters said first cam track adjacent the start of the first described radially outwardly turned portion thereof.

In accordance with the invention the entrance to said by-track portion is normally closed by a gate, which gate, however, is adapted to be opened and so as to force the cam follower to enter said by-pass track portion when the cam follower and clutch has moved the tone arm inwardly along the full extent of said first mentioned radially inturned portion of the cam track without the tone arm abutting a record. The cam follower by entering said alternate track portion causes the tone arm clutched thereto to move outwardly or laterally of the turntable to a position of rest beyond the turntable. The invention further provides means actuated by movement of the cam follower into said by-pass track portion which effectively locks the tone arm when it has been moved to said rest position whereupon the clutch connecting the follower to the tone arm slips so as to permit the follower to be returned by the by-pass portion to the starting position of the first track with continued rotation of the cam.

Thus it is the feature of the invention that the cam serves not only to properly locate the stylus of the tone arm in the starting groove of each record lowered to the turntable, regardless of its diameter, but also serves to locate the tone arm off the turntable in a position of rest after the last record has been played.

A companion feature of this arrangement is that after the last record has been played and the player is therefore ready to be shut off and/or to be reloaded the tone arm is located in a position off the records, rather than allowed to remain in the groove of the last record and/or to continue the record changing cycle.

A still further feature of the invention is that shut-off means are provided for turning off the player, the shut-off means being actuatable subsequent to the setting of the tone arm locking means so that simultaneously as the cam completes a full rotation to return the cam and its associated followers to their starting positions the record player, including the turntable motor, also shuts off automatically.

A further feature of the invention is that a separate track is provided for operating a rocker arm which effects raising of the tone arm at the end of a record play and permits the tone arm to be lowered to the turntable after the cam has rotated through a full revolution or 360°.

It is a further feature of the invention that said rocker arm which is operated by said second cam track also operates the clutch by which the mentioned cam follower is connected to the tone arm. This provides the advantage that the tone arm is clutched to the cam only during the period of actual rotation of the cam, that is during a record change cycle and at all other times, as during record play, the tone arm is free for lateral movement independently of rotation of the cam.

Another feature of the invention is that the free end of the rocker arm, which is actuated by the second cam track, only indirectly acts on the tone arm and clutch. Thus it is a feature of the invention that raising of the tone arm is obtained by an independently operable lift plate, the rocker arm operated by the second cam track which supports the lift plate reacting against a spring during the stopped condition of the cam, but releasing its reaction on the spring during rotation of the cam wherefore the spring is able to act on the rocker arm allowing it to raise the lift plate and thereby the tone arm. This arrangement permits not only manual raising of the tone arm independently of the rocker arm position, as for example during record play, but also assures safe manual vertical and lateral manipulation of the tone arm while avoiding the possibility of mechanical jamming during the cycling of the tone arm in the record changing act.

Many other objects, advantages and/or features of the invention will be at once apparent or will be suggested by the description of a preferred embodiment of the invention which now follows and is described in connection with the several figures of the accompanying drawing.

Referring now to the drawings.

Referring now to the several figures of the drawing wherein corresponding parts are identified by like reference numerals, one embodiment of the invention will now be described in detail.

Figure 1:
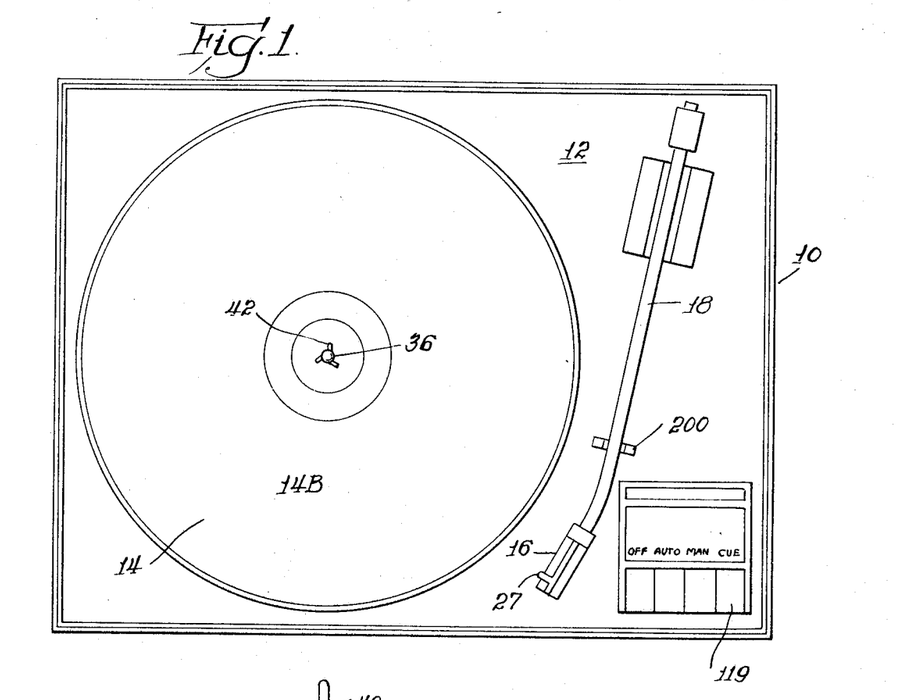
FIGURE 1 is a top plan view of a phonograph record player utilizing the present invention.
Figure 3:
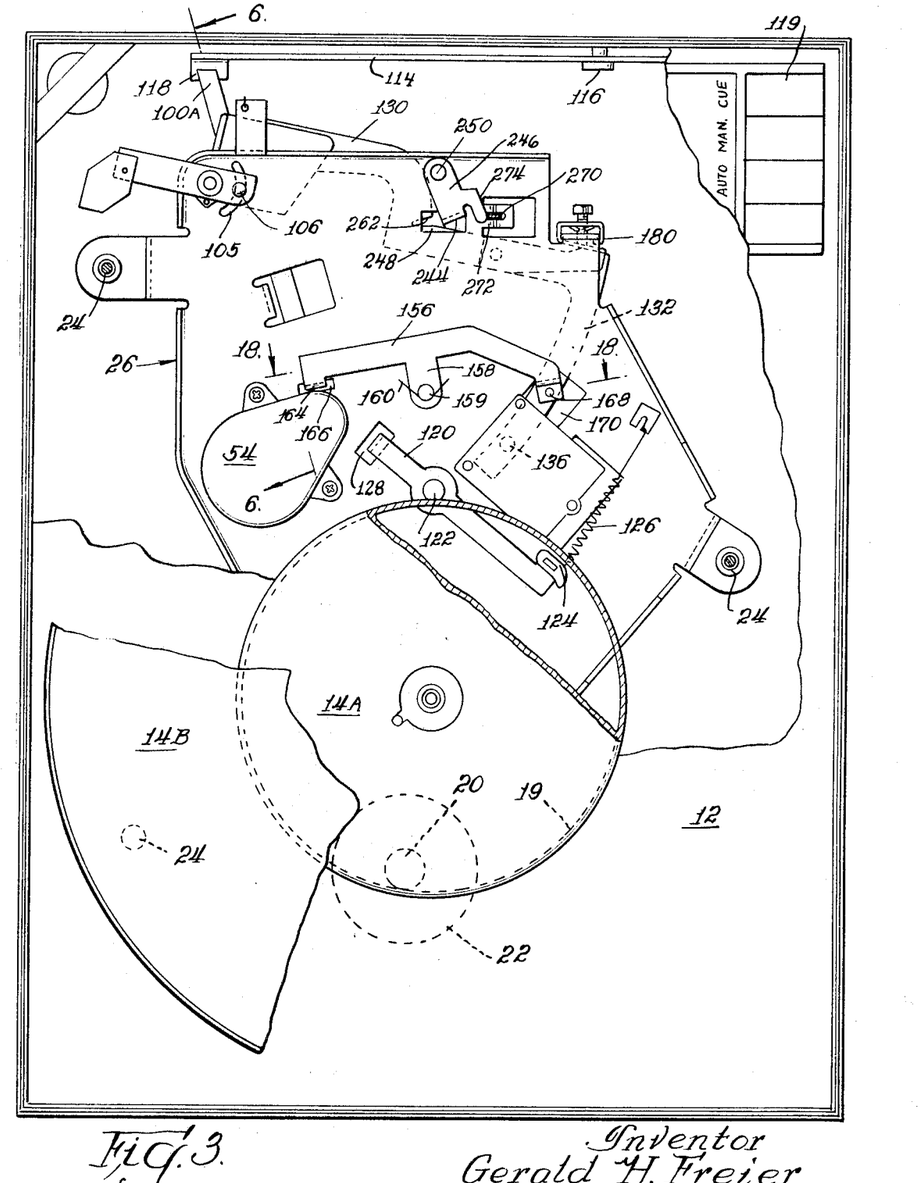
FIGURE 3 is a fragmented top plan view taken immediately below the base plate and illustrates the works mounting plate and the associated elements supported thereon and in relation to the turntable.

In FIGURE 1, 10 identifies an automatic phonograph record player having a base plate or panel 12 on which is rotatably mounted a turntable 14 so as to rotate a record supported thereon for playing by means of a stylus 16 of tone arm 18 which is free to track in the groove thereof. Turntable 14 is preferably driven at the proper speed by a belt drive system as is described and claimed in my assignee's copending Douglas W. Smith application, Ser. No. 564,366, filed July 11, 1966. However, it may also be driven by conventional means such as illustrated in FIGURE 3 wherein the turntable is shown as comprising an inner turntable 14A on which rests a larger diametered outer turntable 14B so as to turn therewith and serves to support the record or records deposited thereon for playing. As shown by FIGURE 3, inner turntable 14A has a periphery disposed flange 19 against the inner side of which a drive wheel 20 mounted on the arbor of motor 22 drivingly engages.

Figure 6:
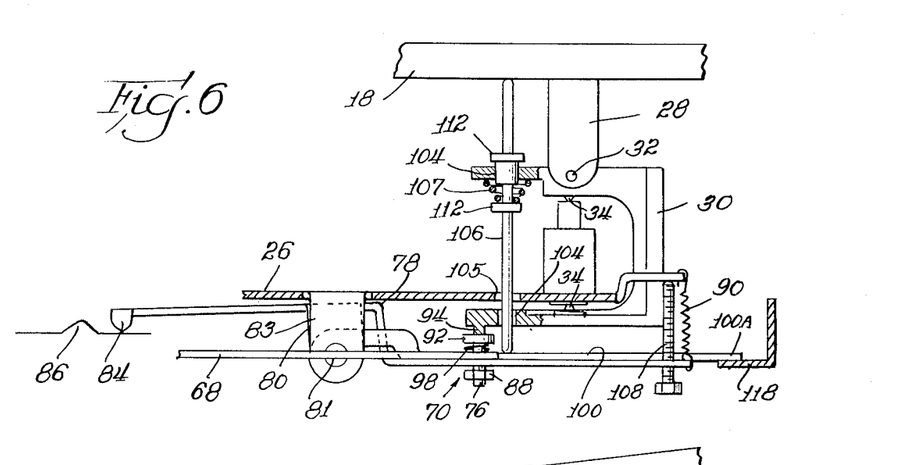
FIGURE 6 is an enlarged partially fragmented view taken along lines 6—6 in FIGURE 3 and shows details in the construction of the clutching arrangement by which the cam follower is connected to the tone arm to effect lateral movement of the tone arm with rotation of the cam during the record change cycle.

Suspended to the base plate 12 in any suitable manner, as by grommets or springs 24, is a works mounting plate 26 on which is supported the tone arm 18. It will be understood that tone arm 18 is supported to be free not only to pivot about a vertically disposed axis in order that its stylus 16 may move laterally and so follow the groove in the rotating record, but it must also be capable of pivoting about a horizontal axis to allow its stylus to be raised out of the groove at the completion of record playing and to be returned thereto at the start of play. A suitable mounting therefore is illustrated by FIGURE 6 wherein tone arm 18 is shown supported on a cradle 28, pivotally mounted on a supporting yoke 30 as by pivot pin 32 so as to be free to move with cradle 28 through a vertical plane, yoke 30 in turn being pivotally supported at either end of a bearing mount 34 which is fixed to works mounting plate 26. Tone arm 18 is therefore also free to move horizontally with yoke 30 about the axis of bearing mount 34 and laterally with respect to the turntable and a record supported thereon. A construction of a tone arm and mounting useful for the purposes of the present invention is illustrated and described in my copending application, Ser. No. 611,886, filed Jan. 26, 1967 and owned by my assignee to which reference may be had for a more complete understanding thereof as well as operation.

Figure 2:
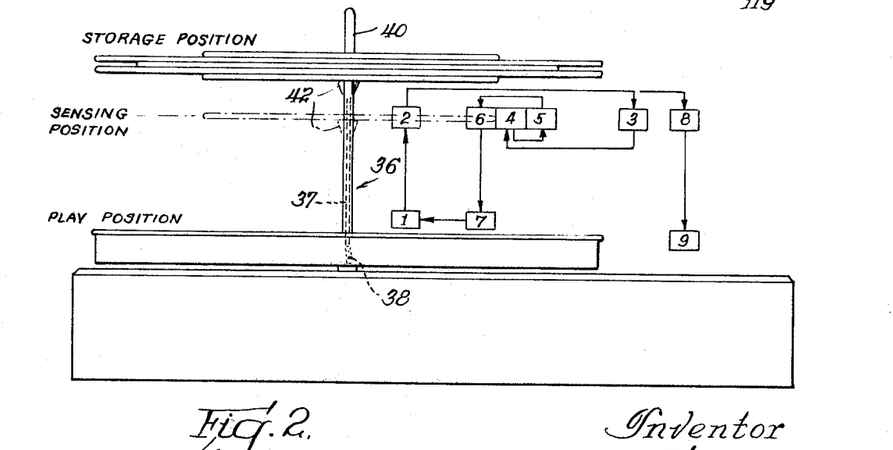
FIGURE 2 is a side elevational view thereof and illustrates schematically the coordinated movements of a record and the tone arm in a record changing cycle as obtained by the present invention.

At 36 extending centrally of the turntable 14 is a spindle which serves to center a record in play position on the turntable. As illustrated by FIGURES 1 and 2, spindle 36 is of the self supporting type, that is to say it includes means such as expandable cap 40 and record supporting fingers 42 which serve to support a stack of records in spaced relation over the turntable. The record supporting fingers 42 are in turn movable vertically of the spindle 36 so as to release the bottom record of the stack to the turntable, cap 40 being expanded during the lowering of said fingers 42 to support the remaining records of the stack in the overhead storage position of the spindle. Although any suitable construction of spindle and record lowering means may be employed with the present invention, spindle 36 is preferably constructed as illustrated and described in copending application Ser. No. 449,533 of Robert J. Hammond, filed Apr. 20, 1965 which is owned by my assignee, and to which reference may be had for a complete understanding of its construction and operation.

Figure 5:
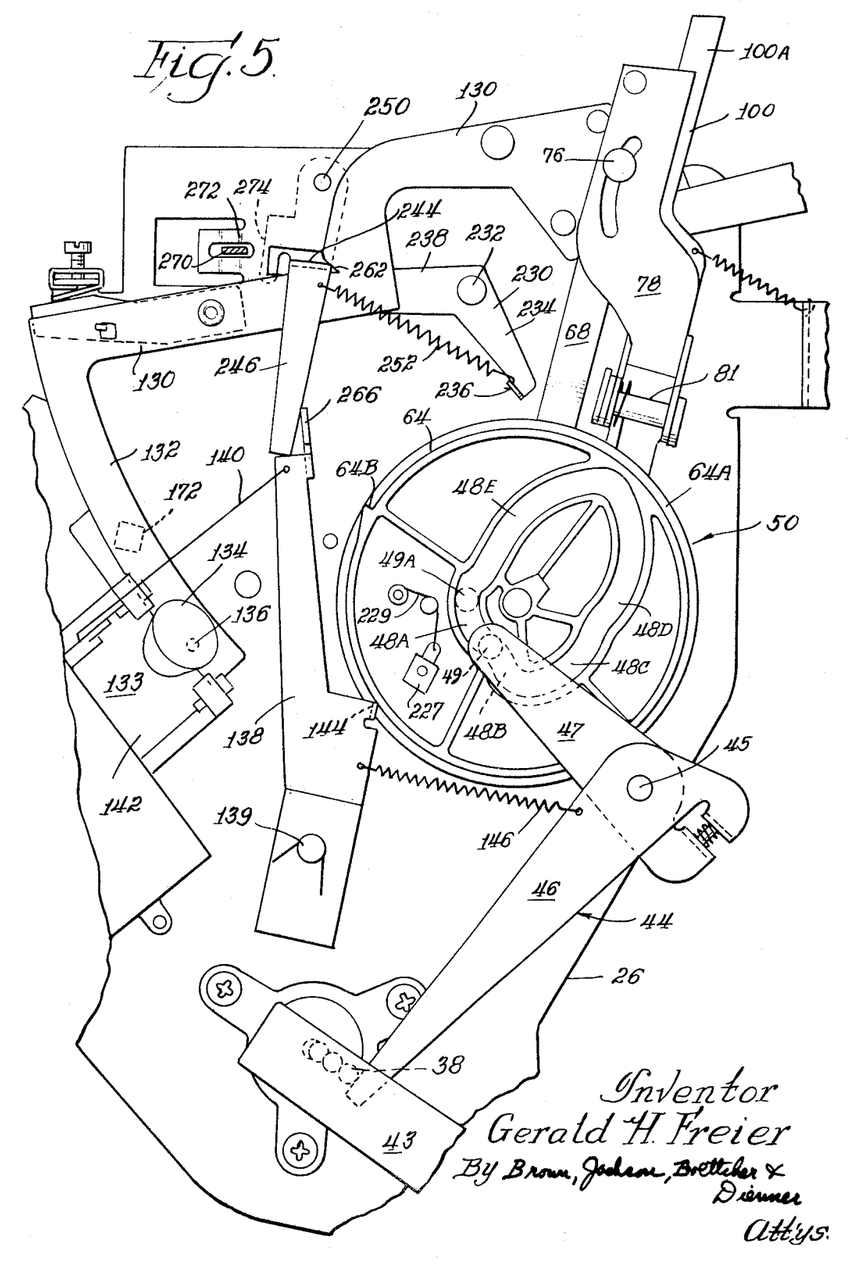
FIGURE 5 is a partially fragmented plan view in which the mounting plate and associated members mounted thereon are viewed from the underside thereof.

Referring therefore to FIGURE 2, it will be seen that during a record change cycle fingers 42 are caused to move downwardly so as to lower the bottom record of the stack to a "record sensing position" spaced over the turntable where the record is held long enough for the tone arm 18 to be brought into abutment with the peripheral edge of the thus supported record in order to sense its size as hereinafter described. Thereafter the fingers are lowered into the turntable so as to gently lower the record all the way to the turntable or so as to rest the record on the previously played record still supported on the turntable. Vertical movement of the fingers 42 may be obtained by any suitable means. For example, as more fully described in the mentioned Hammond application, Ser. No. 449,533, fingers 42 may be supported on a carrier 37 which rests on the top one of a train of balls 38 which move vertically in spindle 36 under the control of a bell crank lever 44 shown in FIGURE 5 as pivotally mounted at 45 to the underside of the works mounting plate 26. Bell crank lever 44 has the end of one of its arms 46 operating in horizontal track portion 43 against the last ball in said train of balls which extends into the center spindle 36. The other arm 47 of said bell crank lever 44 has a roller 49 engaging in track 48 of a cam 50 which is also rotatably supported on the underside of said works mounting plate 26. As illustrated in FIGURE 5, cam track 48 is of a non-circular contour so that as the cam is rotated about its axis 52 roller 49 following in the track serves to move the record supporting fingers 42 through a desired sequence to effect the required lowering of the bottom record of the stack from the storage position indicated in FIGURE 2 first to the record sensing position and then to the play position and return. For example, as illustrated by FIGURE 5, understanding the cam to be rotated in a clockwise direction starting with the roller 49 at position 49A where the record supporting fingers are at their uppermost position supporting the stack of records at the storage position of the center spindle 36, the roller 49 first enters a concentric track portion 48A in which the fingers are held stationary. Thereafter the roller moves into a cam track portion 48B which pivots the bell crank lever 44 about pin connection 45 so as to lower the fingers and the bottom record supported thereon to the record sensing position. Thereafter cam track portion 48C being concentric about the axis of rotation of cam 50 causes the bell crank lever 44 to hold the fingers and the record supported thereon at the record sensing position for the time it takes the roller to move through said track portion, after which roller 49 enters cam track portion 48D so that as the cam continues to rotate, it rocks bell crank lever 44 so as to lower fingers 42 into the turntable and thereby gently lower the record all the way to the turntable, the fingers being afterwards returned to their uppermost position by the roller 49 following in cam track portion 48E.

In accordance with the invention, means are provided whereby vertical and lateral movements of the tone arm are synchronized with the aforedescribed lowering of a record to the turntable so that the tone arm is first raised off the record at the end of record play and then moved outwardly to provide clearance for the record which is lowered to the size sensing position. The tone arm having initially been raised to the height of said size sensing position is then brought inwardly to abut the record lowered to said position so as to sense its size and is then backed away from the record a controlled increment to allow the record to be lowered by the fingers 42 under the control of bell crank lever 44 the rest of the way to the turntable. After the record has been lowered to the turntable, the tone arm is then moved inwardly a controlled larger increment over the edge of the lowered record so that its stylus is accurately located over the starting groove of said record and is then lowered to play the record. The means whereby the above movements of the tone arm are obtained so that the record player proceeds automatically to play each record of a group from start to finish, and whether the records are of the same or of random sizes will now be described in detail.

Referring therefore now to FIGURES 4, 5, 8 and 9, said means are illustrated as comprising the aforementioned cam 50 which is mounted beneath works mounting plate 26 and is secured to shaft 52 of motor 54 so as to be rotated thereby. In addition to containing track 48 in its underside which controls the height of the primary record supporting fingers 42 as the cam is rotated by motor 54, cam 50 is provided with a pair of tracks on its upper side in which followers simultaneously move to control the tone arm movements during the record change cycle. One of these tracks is indicated at 56 and operates means controlling the lateral movement of the tone arm 18. The other is indicated at 58 and operates means controlling the raising and lowering of the tone arm at the start and end of the record change cycle. Cam 50 also includes a pair of additional cam tracks in its upper surface, one of which is indicated at 60 and which operates means exercising control over the tripping of motor 54 in accordance with the size of record to be played. The other track is indicated at 62 and operates a brake which stops rotation of the turntable at the proper moment the record is being gently lowered or deposited onto the turntable. The periphery of cam 50 also comprises a sixth cam track 64 which operates means to shut off the cam motor so that rotation of the cam is confined to a full 360° turn as is required to complete the record change. After the last record has been played it also actuates means to shut off the turntable motor.

Figure 4:
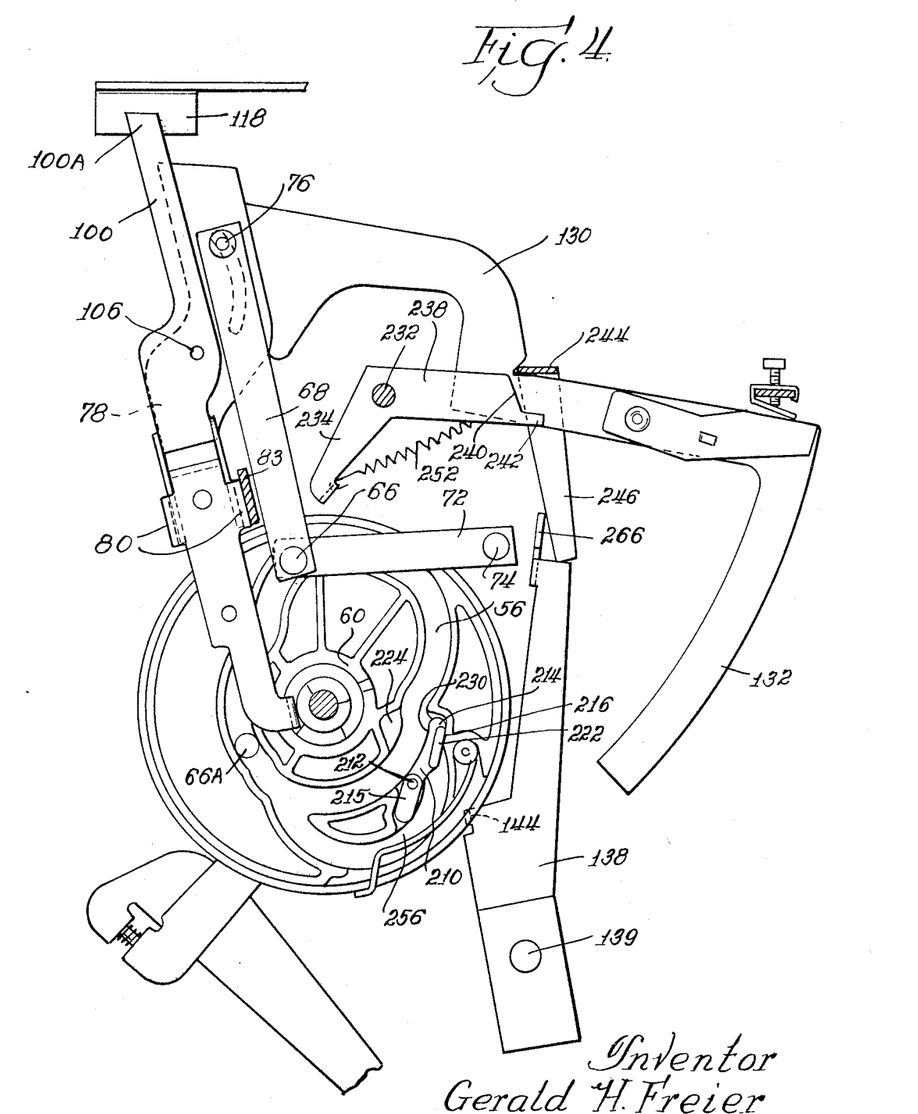
FIGURE 4 is a similar plan view to FIGURE 3 taken with the mounting plate removed and shows the cam and associated members cooperating therewith.
Figure 8:
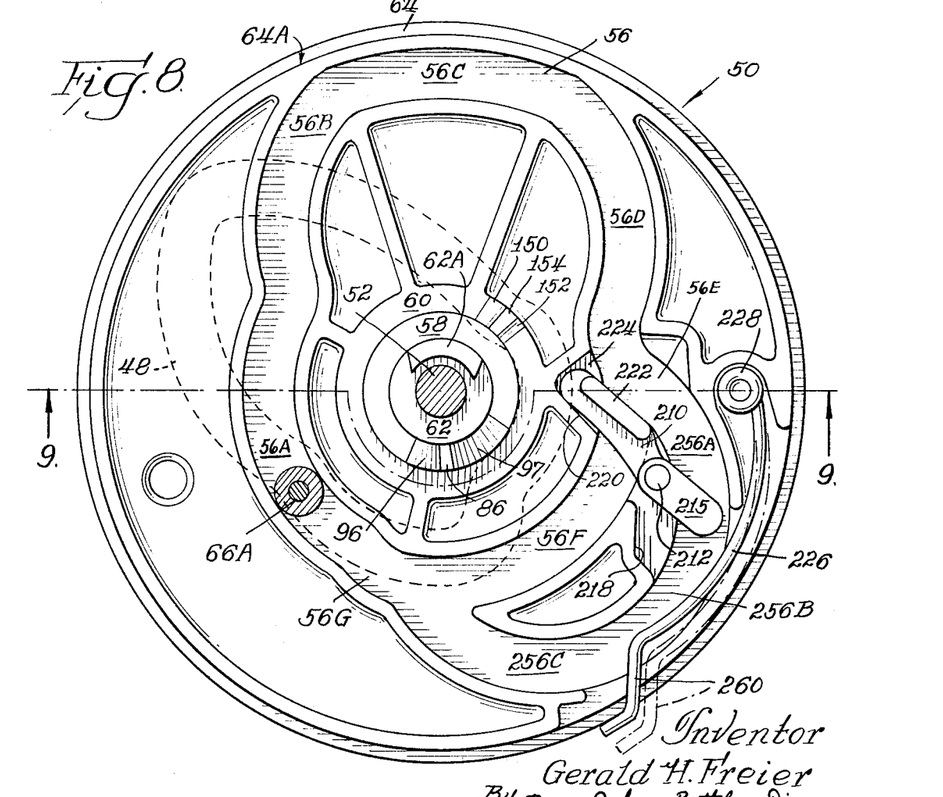
FIGURE 8 is an enlarged top plan view of the control cam and illustrates by phantom lines the two cam tracks which are located on the underside and periphery of the cam.
Figure 14:
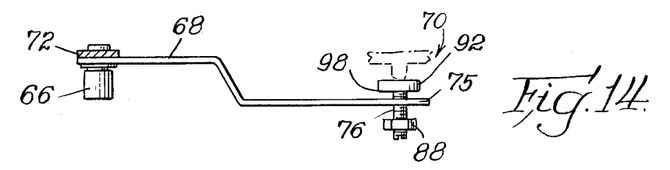
FIGURES 14 and 15 illustrate the cam follower and clutch through which the rotatable cam controls the lateral movement of the tone arm, FIGURE 14 being a side elevational view and FIGURE 15 a top plan view thereof.
Figure 15:
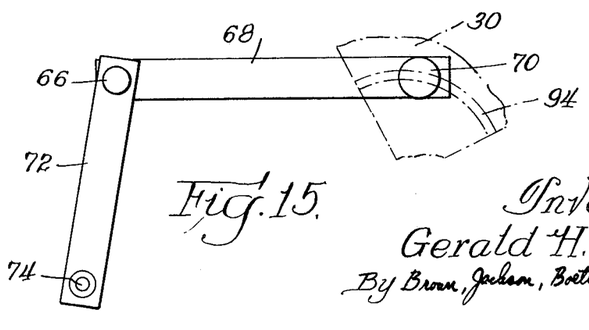

Considering now FIGURES 4, 14 and 15 with FIGURE 8, 66 is a roller rotatably mounted on the inner end of a follower arm 68 for engaging in track 56. The opposite end of said follower arm 68 is adapted by means of a clutch 70 for connection to the yoke 30 of the tone arm (FIG. 6). Cooperating therewith is a control link 72 pivotally connected at one end to said roller 66 and at its opposite end to a pin 74 fixed to the underside of the works mounting plate. As described, track 56 is of noncircular shape so that roller 66 is guided thereby toward and away from shaft 52 about pin 74 as a center so that the tone arm 18 correspondingly moves in a lateral direction relative to the turntable 14 when the follower 68 is clutched thereto. As will be understood, during record play, the tone arm must be free to move independently of the cam to permit its stylus 16 to properly track in the groove of the rotating record. The invention therefore utilizes means such as the mentioned clutch 70 by which the cam follower arm is operatively connected to the tone arm yoke 30 only during the actual record change cycle.

Figure 7:
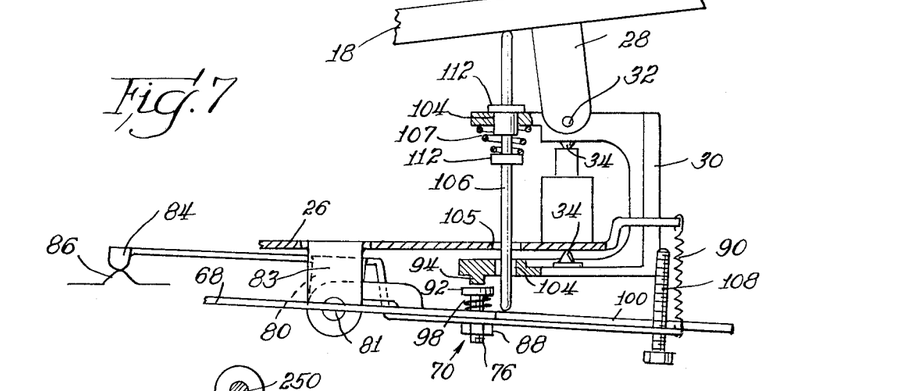
FIGURE 7 is a view generally similar to FIGURE 6 and shows the cam follower declutched from the tone arm, as during record play.
Figure 11:
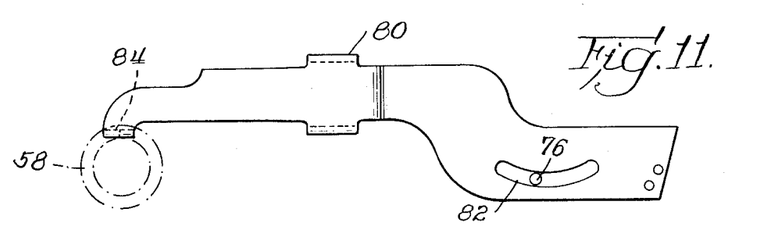

The means which effect the clutching of follower 68 to the tone arm at the beginning of the change cycle and declutch it at the end of the cycle will now be described. Referring therefore also to FIGURES 6 and 7, clutch 70 is shown provided with a stem 76 which fits loosely through a larger sized opening 75 in the outer end of follower arm 68 so that it may be moved vertically relative thereto. At 78 is a rocker arm having hinge ears 80 disposed intermediate its ends which are pivotally connected by pin 81 to between a pair of depending ears formed integrally at 83 with the works mounting plate 26. As shown in FIGURE 6, the outer end of said rocker arm 78 underlies the outer end of the follower arm 68 and contains an arcuate shaped slot 82 (FIG. 11) through which the clutch stem 76 extends, the clutch being connected to the assembly of rocker arm 78 and follower arm 68 by means of a nut 88 threadedly connected to the lower end of the clutch stem 76. The opposite or inner end of the rocker arm 78 has a portion 84 which follows in cam track 58 and in the stopped condition of the cam, as during record play, rests on rise 86 in said track 58. As shown in FIGURE 7 with the end 84 of the rocker arm 78 resting on rise 86, its outer end reacts on nut 88, stretching spring 90 connected between the works mounting plate 26 and the outer end of rocker arm 78 so that pad 92 of the clutch is held out of engagement with the tone arm yoke 30. However, as cam 50 starts to rotate, end 84 of the rocker arm moves down relatively steep slope 96 of the rise 86 so as to rapidly remove the tension exerted by the rocker arm on the spring 90. With the reaction of the rocker arm 78 relieved as the end of the rocker arm 84 travels in the circular cam track 58 during rotation of the cam, spring 90 is caused to carry the outer end of the rocker arm 78 upwardly and so hold pad 92 of the clutch in engagement with rib 94 on the underside of the yoke 30 so as to frictionally clutch the follower arm 68 to the tone arm. As the cam completes its revolution and end 84 of the rocker arm 78 reapproaches rise 86 it is caused to move up gradual slope 97 to again react against spring 90 and to hold the clutch out of engagement with said rib of yoke 30 and thereby free the tone arm for independent lateral movement as during record play. Preferably, as seen best in FIGURES 14 and 6, compression spring 98 is disposed between clutch pad 92 and the outer end of follower arm 68 in encircling relation about the clutch stem 76 and the clutch stem is also made sufficiently long as to permit limited travel of the rocker arm before the clutch pad 92 is actually retracted from its frictional engagement with rib 94 on the underside of yoke 30. By such an arrangement spring 98 serves first to provide positive but yieldable engagement between the clutch pad 92 and rib 94 during the change cycle. The greater length of the clutch stem 76 also in cooperation with spring 98 constitutes means for holding the clutch pad in engagement with said rib as end 84 of the rocker arm is moved up slope 96 at the end of the change cycle. The tone arm therefore remains clutched to the follower 68 until the very last moment and so minimizes possible drift of the tone arm during its set down on the record, which is also accomplished by the rocker arm 78 moving up along slope 97 over rise 86 in track 58 as will now be described.

Figure 12:
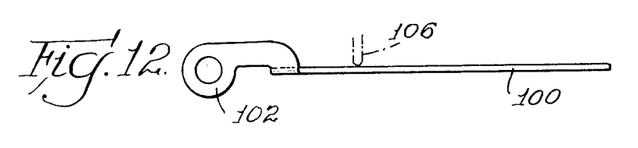
FIGURES 12 and 13 illustrate the lift plate which is assembled with the rocker arm of FIGURES 10 and 11 for simultaneous and independent pivoting thereof in the elevating and lowering of the tone arm, FIGURE 12 being a side elevation and FIGURE 13 a top plan view thereof.
Figure 13:
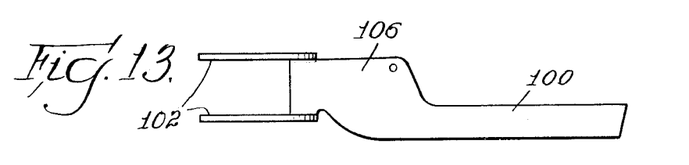

As suggested above, rocker arm 78 also serves as means for simultaneously elevating and lowering the tone arm with respect to the turntable and the record supported thereon. As shown in FIGURE 4, the outer end of rocker arm 78 is made wide enough so that a lift member 100 may rest thereon in side-by-side relation to follower arm 68 which is also supported thereon. Such a lift member 100 is shown in FIGURES 12 and 13 as provided with a pair of hinge ears 102 by which it is hingedly connected between ears 83 of the works mounting plate 26 by pin 81 which also pivotally connects the rocker arm thereto. At 106 (FIG. 6) is a lift pin having its lower end seating on said lift plate, said lift pin extending upwardly through provided openings 104 in the supporting yoke 30 and also through arcuate slot 105 in mounting plate 26, its upper end engaging the underside of the tone arm 18 forwardly of its horizontal pivotal connection 32 to the yoke. With the outer end of the rocker arm 78 in its retracted position as illustrated by FIGURE 7 wherein its inner end 84 rests on rise 86, the bias of the spring 107 on lift pin 106 is sufficient that the tone arm disengages pin 106 in its lowered position in engagement with the record groove during play. As noted above, slot 105 in mounting plate 26 is an arcuate shape (FIG. 3) and lift plate 100 has a sufficient width (FIG. 13) that the lift pin is free to slide along the lift plate as the tone arm swings in response to clutch 92 driving on rib 94 and without dislodging from the lift plate 100. As shown in FIGURE 6, rocker arm 78 may be provided with a screw 108 which limits the height to which the tone arm may be raised by the lift arm. As will hereinafter be made clear, it is important in the record edge sensing step of the change cycle that the tone arm be held at a height corresponding to the height at which the record is supported in its sensing position over the turntable by the primary record supporting fingers 42. Collar 112 serves the useful purpose of constituting an abutment beyond which the lift pin cannot be lowered by the action of spring 107 when the reaction thereof of the rocker arm 78 is relieved. This prevents lift pin 106 resistively sliding on plate 100 during record play eliminating undesirable side loading on the stylus in the record groove. Usefully, lift plate 100 is also provided with an extension 100A by which it may be actuated independent of the rocker arm 78 to permit elevation of the tone arm during record play. Thus as shown in FIGURE 3, a cue lever 114 is pivotally connected to the player at 116 and is provided with a catch 118 located to underlie end 100A of the lift plate. The opposite end of the lever 114 is associated with cue key 119 such that by depressing key 119 lever 114 may be pivoted so as to raise catch 118 into engagement with end 100A and so lift the tone arm off the record as when it is desired to interrupt record play for any reason.

Referring therefore now to the cam itself, track 56 as shown by FIGURE 8 is of a non-circular shape related to shaft 52 on which the cam rotates to effect the required lateral movements of the tone arm during the record change cycle. Thus said cam track 56 comprises in sequence to effect the follower 68 as the cam rotates a first concentric portion 56A, a radially outwardly turned portion 56B, an outer concentric portion 56C, a relatively long radially inturned portion 56D, a radially outturned portion 56E of short length, a third concentric portion 56F, and a short radially inturned portion 56G which enters into the first concentric portion 56A. As shown in FIGURE 8, these enumerated portions of track 56 are so radially spaced from shaft 52 and of an angular extent in relation to the previously enumerated portions of track 48 and also of track 58 as to properly relate the tone arm to the lowering record during the change cycle as schematically set forth in FIGURE 2. Referring therefore to said FIGURE 2, and considering it also with FIGURES 4 and 8, 66A will be considered to represent the rest position of the roller 66 in track 56 when the cam is stopped as during record play. It will be also understood that in this condition of the cam, end 84 of the rocker arm 78 also rests on the top of rise 86 so that the stylus of the tone arm 18 engages in the groove of the rotating record and is free to move inwardly of the record toward the center spindle of the turntable to complete the record play as the turntable rotates. At the end of record play, rotation of cam 50 is initiated by means as will hereinafter be more particularly described. Upon energizing of the cam motor 54 cam 50 is caused to rotate in the direction indicated by the arrow in FIGURE 8 so as to move rise 86 away from end 84 of rocker arm 78. Said end 84 of the rocker arm therefore moves down slope 96 of the rise into the planar portion of the circular cam track 58 so that spring 90 is able to raise the outer end of the rocker arm 78. The raising of the outer end of the rocker arm by spring 90 causes lift plate 100 mounted thereon to act on lift pin 106 so as to pivot the tone arm vertically about pivot 32, lifting its stylus 16 out of the record groove and so that said free end of the tone arm carrying the stylus is moved from position 1 of FIGURE 2 into position 2 which as shown in said figure corresponds to the height at which the bottom record of the stack is initially lowered by fingers 42 from the record storage position on spindle 36. This lowered position of the record is designated in said FIGURE 2 as the "record sensing position." Simultaneously the raising of the outer end of rocker arm 78 under the action of spring 90 causes pad 92 of the clutch 70 to frictionally bind against rib 94 on the underside of the yoke to which the tone arm is pivotally connected at 32. However, as will be seen from FIGURES 4 and 8, roller 66 of the follower 68 initially moves through a first concentric portion 56A so that during this raising of the tone arm out of the record groove to position 2 the tone arm does not move laterally but is held stationary. However, as the cam continues to rotate, roller 66 of the follower 68 enters outwardly turned track portion 56B causing the follower 68 to move rapidly away from the center of rotation of the cam so as to cause follower 68 under the guidance of link 72 and clutch 70 to move the tone arm laterally outwardly beyond the turntable periphery to position 3, indicated in FIGURE 2. During this period of rotation of the cam 50 follower 46 controlling the vertical movement of the primary record supporting fingers 42 is moving through concentric portion 48A of cam track 48 so that the fingers 42 do not move. However, as the cam follower roller 66 enters the outer concentric portion 56C of track 56 follower 49 enters the outwardly turned portion 48B of cam track 48 rocking bell crank 44 so that fingers 42 lower a distance sufficient to carry the bottom record of the stack to the "record sensing position." Simultaneously the secondary record supporting means comprising cap 40 are actuated as described in the mentioned Hammond application, Ser. No. 449,533, so as to hold the remaining records of the stack in the overhead storage position on the center spindle 36. Portion 56C of track 56 being concentric about shaft 52 on which said cam rotates causes the cam follower 68 to hold the tone arm stationary at position 3. Thereafter, follower 49 moves into concentric portion 48C of the cam track 48 so that the bell crank 44 then halts the lowering of the record supporting fingers 42 so that the record is held in the sensing position. Simultaneously, roller 66 continuing to follow in track 56 enters inwardly turned track portion 56D causing its follower 68 through clutch 70 to return the tone arm inwardly over the turntable. As illustrated by FIGURE 2, the tone arm 18 having been raised to the height of the record sensing position is therefore moved inwardly by the rotating cam until a stop portion 27 on its free end abuts the edge of the record lowered to said sensing position indicated as position 4 in FIGURE 2. In accordance with the invention track portion 56D extends radially inwardly a distance greater than is required to carry the tone arm into abutment with the smallest size of record to be played, it being recognized that although roller 66 will continue to be carried inwardly to the end of track portion 56D, the record abutted will provide resistance to further inward movement of the tone arm causing clutch pad 92 to slip along rib 94 of the tone arm yoke 30. Thus cam track portion 56D serves to locate the tone arm against the edge of the record lowered to the sensing position within the usual range of record sizes. Having located the tone arm in position 4 at the edge of the record and roller 66 continues to the end of the inwardly turned portion 56D and then enters outwardly turned portion 56E as the cam continues to rotate, causing the cam follower to reverse its direction of movement about pivot pin 74. Since in this reverse direction of movement of follower 68 the record affords no resistance to the tone arm movement, the tone arm remains clutched to the follower and moves outwardly therewith to position 5. Cam track portion 56E has its outer end radially displaced from its inner end just enough to clear the tone arm from the record so that it may be thereafter lowered without disturbing the tone arm. Cam collower 49 then enters portion 48D of the cam so that bell crank 44 acts on the record supporting fingers 42 so that the record is gently lowered the remaining distance to the turntable and the fingers being retracted as they are drawn beneath the surface of the turntable either by engaging the inner surrounding edges of the turntable or the surrounding edges of the centerhole of the previously deposited record whereby the lowered record is released to the turntable. As the cam continues to rotate, follower 49 then enters portion 48E of the cam track 48 so as to return the fingers 42 to their upper supporting position on the spindle. As this is occurring roller 66 follows in the third concentric portion 56F so that the follower 68 holds the tone arm stationary, both during the final lowering of the record to the turntable and also as the fingers are returned by the bell crank 44, now emptied of their load, back to their upper position where they resume their function of supporting the record stack in the storage position on the spindle during record play. Actually, concentric portion 56F need be of an angular extent only sufficient to hold the tone arm at position 5 long enough to allow the record supporting fingers to have been lowered onto the turntable and then to have been returned to above the record sensing position. As the cam rotates to continue the raising of fingers 42 to their upper extent on the spindle 36, it also causes roller 66 to enter inwardly turned portion 56G of cam track 56 causing the cam follower 68 to carry the tone arm 18 clutched thereto inwardly to position 6 in FIGURE 2 to locate the stylus of the tone arm over the starting groove of the record now resting on the turntable. It will be apreciated that the outward movement of the tone arm which is obtained by cam track section 56E and the inward movement of the tone arm which is obtained by cam track portion 56G are so related that the tone arm is initially backed off from the record to clear the tone arm for lowering the record to the turntable and is then returned over the lowered record a distance slightly greater and such as to cause the stylus to be accurately aligned with the starting groove in the record. As the cam completes its full revolution roller 66 of the cam follower is carried into concentric portion 56A from which it started on initial rotation of the cam. Simultaneously cam follower 49 is returned by portion 48E of cam track 48 to its starting position 46A, as indicated in FIGURE 5, and end 84 of the rocker arm 78 is returned to rise 86 in track 58. The record change cycle is therefore completed by end 84 of the rocker arm 78 climbing slope 97 to its rest position on the top of rise 86 as the cam stops. As previously described, clutch pad 92 of the clutch is backed by a spring 98 and the clutch stem 76 has a length sufficient that as end 84 of the rocker arm climbs slope 97 of the rise so as to cause the stylus of the tone arm to set down into the record groove the follower arm 68 will remain clutched to the tone arm assembly until the last instant. By this arrangement the follower arm 68 acts to hold the tone arm steady in position 6 to which it has been located by cam track portion 56G, the tone arm thus being held steady and against drifting as it is lowered to position 7 into the starting groove of the record.

Figure 9:
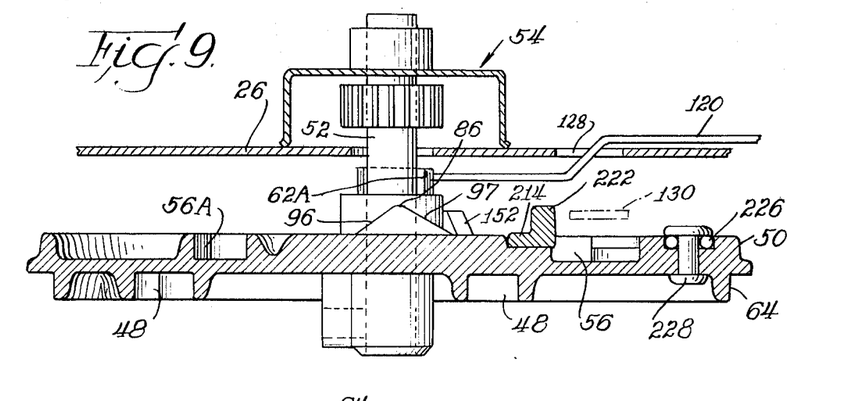
FIGURE 9 is a sectional view taken through the cam along lines 9—9 of FIGURE 8 and also shows a fragment of the brake actuating arm controlled by the cam.
Figure 10:
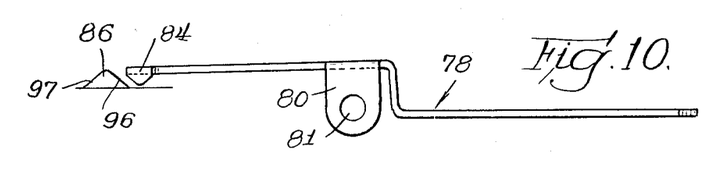
FIGURES 10 and 11 illustrate the rocker arm which is actuated by the cam to raise and lower the tone arm and also the clutch member, FIGURE 10 being a side elevation thereof and FIGURE 11 a top plan view thereof.

The invention also provides means whereby as follower 49 moves through track portion 48D of the cam to effect the final lowering of the record into play position on the turntable the turntable will have stopped long enough to receive the record and thereafter be returned to its normal record play speed before the tone arm is lowered into the starting groove by the action of follower 84 of the rocker arm 78 moving up slope 97 of track 58 at the end of the change cycle. As illustrated by FIGURES 3 and 9, such means comprises a lever 120 shown pivotally connected intermediate its ends by pin 122 to the upper side of the works mounting plate 26 so as to be rotatable thereon parallel to the works mounting plate 26. Mounted on one end of said lever is a brake pad 124 which is adapted to frictionally engage the inner surface of the peripheral depending flange of the inner turntable 14A under the pull of tensioned spring 126 so as to provide resistance to the drive of wheel 20 and so hold the turntable against rotation thereby. The opposite end of lever 120 extends through an opening 128 (FIGURES 3 and 9) provided in the works mounting plate 26 so as to be engaged by upstanding portion 62A in concentric track 62 on the upper side of the cam 50. As shown in FIGURE 8, upstanding portion 62A is located along said track 62 and so spaced from the axis of shaft 52 about which the cam rotates that its outer surface in engaging the lever 120 displaces it about pin 122 so as to hold the brake pad 124 out of engagement with the turntable flange in the stopped position of the cam. The turntable is therefore free to be rotated by the turntable motor 22 and drive wheel 20 during record play. Upstanding portion 62A extends along track 62 through a sufficient angle of cam rotation that it continues to act on the lever 120 so as to hold the brake pad in said spaced relation to the turntable flange against the action of spring 126 until the cam is rotated through a sufficient angle to locate the follower 49 in cam track portion 48D where it is effective to cause the crank lever 44 to lower the record from the size sensing position to the play position on the turntable. Consequently the record is released to the turntable while it is stopped and so that a possibility of injury to the record is minimized. As the cam follower 49 moves into cam track portion 48E so as to raise the record supporting fingers to the record storage position on the spindle 36 the upstanding portion 62A again reengages the end of lever 120 so as to move the brake pad out of engagement with the turntable flange and so that rotation of the turntable is restarted before the tone arm stylus is lowered by end 84 of the rocker arm 78 moving up the slope 97 to seat on the rise 86 as the cam comes to a halt and allows the tone arm stylus 16 to be lowered into the record groove to start playing of the record.

Any suitable means may be utilized for initiating rotation of the cam 50 at the end of record play and stopping its rotation at completion of the record change cycle. As earlier described, cam 50 is secured to shaft 52 of motor 54 so as to be rotated thereby when the motor is energized. In the illustrated embodiment of the invention cam motor 54 is energized by means of a photocell tripping arrangement as more specifically described in the copending application of Hammond and Arent, Ser. No. 582,689, filed Sept. 28, 1966 and owned by my assignee, to which reference may be had for a detailed description thereof. However, for purposes of the present invention it will be understood that as seen in FIGURES 3 and 4 when considered with FIGURES 16 and 17, that the tone arm assembly includes a trip arm 130 which is secured to yoke 30 so as to move with the tone arm during record play. As illustrated in FIGURE 5, trip arm 130 includes an arcuate light occluding member or baffle 132 which is located as to pass between prism 134 which receives light from source 133 and a photocell 136 to which the prism directs said received light. Photocell 136 is shown mounted on the underside of works mounting plate 26 and will be understood to act as a switch in the motor circuit of motor 54 so that the motor is energized to rotate the cam 50 only under those conditions when the photocell is illuminated. Baffle 132 is so shaped and is of a length such that as it moves with the tone arm during record play it lies between the prism 134 and photocell 136 so that the photocell remains dark and the circuit to the cam operating motor 54 is interrupted wherefore the cam does not rotate. However, as soon as the tone arm stylus has moved inwardly on the record a predetermined distance from the center spindle which has been selected to correspond to the end of the play groove of conventional records the tone arm will also have carried the baffle arm 132 beyond the prism 134 and the photocell so that the latter is now exposed to light from the prism. The motor circuit is therefore completed and the cam starts to rotate. It will be understood that as cam 50 starts to rotate, its track 58 acts on the rocker arm 78 to clutch the cam follower 68 to the tone arm yoke wherefore the tone arm will start to move back across the record as the roller 66 moves through track portion 56B. Since trip arm 130 is connected to the tone arm assembly its baffle 132 will simultaneously move back to interrupt light passage from the prism to the photocell 136 with the expected result of interrupting the motor circuit and stopping rotation of the cam. However, as is described in said Hammond and Arent application Ser. No. 582,689, means are provided in the form of a trip arm 138 (FIG. 5) pivotally connected at one end to the underside of the works mounting plate as at 139 and having its opposite end connected by link 140 to operate a shutter 142 on the light source 133. Intermediate its end said lever 138 has a part 144 which rides on the outer periphery of the cam 50, designated previously as cam track 64, under the pull of a spring 146 shown connected between one arm 46 of the bell crank lever 44 and lever 138 at a point intermediate its part 144 and pivotal connection 139. As shown in FIGURE 8, track 64 comprises in the main a surface 64A extending about the periphery of the cam and concentric with the center rotation of the cam. However, at 64B it also includes an outwardly extending projection having a surface which is spaced a greater radial distance from said center rotation of the cam than surface 64A. Thus in the stopped condition of the cam projection 144 of the lever 138 rests on projection 64B so the link 140 holds the shutter closed and the photocell cannot be energized except by light which the baffle 132 allows to be passed from the prism 134 thereto. During record play baffle 132 remains disposed between the prism and photocell wherefore no light reaches the photocell and the cam does not turn. However, as soon as the tone arm has been moved far enough inwardly toward the center of the turntable by the record play groove to cause baffle 132 to expose photocell 136 to light from prism 134, cam 50 will start to rotate as previously described. As the cam starts to rotate, projection 64B on its periphery will move beyond part 144 of lever 138 allowing spring 146 to rock the lever inwardly until its part 144 engages the concentric surface 64A which it will continue to engage until the cam has completed a full revolution. With part 144 engaging concentric surface 64A, link 140 has been actuated by the lever 138 so as to open shutter 142 allowing light source from 133 to bypass the prism and directly illuminate the photocell 136. Under this condition which occurs throughout the entire record change cycle, motor 54 will continue to operate. As soon as the cam, however, is rotated a full 360° and has returned projection 64B into position to reengage lever part 144, lever 138 will reclose shutter 142 and baffle 132 will be in position between the photocell and prism so that the photocell will darken and cam 50 will stop with the deenergizing of motor 54.

Figure 16:
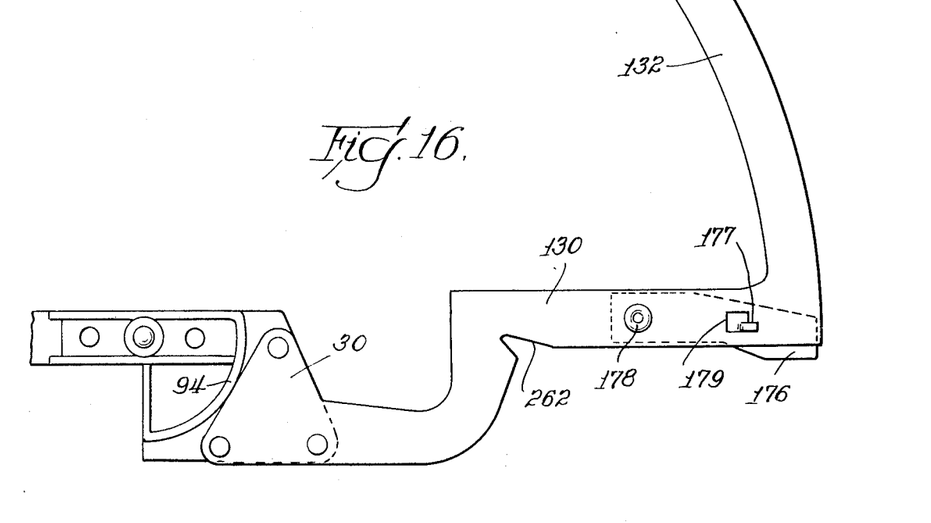
FIGURES 16 and 17 illustrate tone arm yoke and trip arm connected thereto which trips the photocell circuit to energize the rotatable cam, FIGURE 16 being a bottom plan view thereof and FIGURE 17 a side elevational view thereof.
Figure 17:
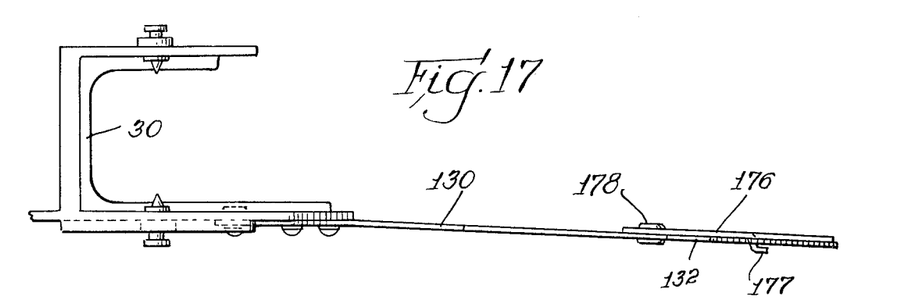
Figure 18:
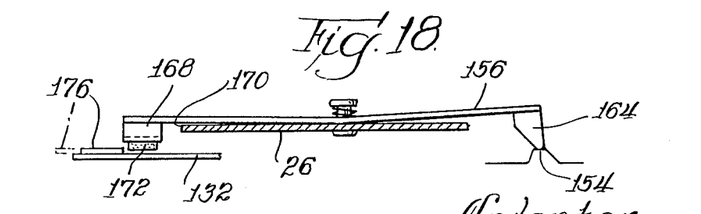
FIGURE 18 is a view taken along lines 18—18 of FIGURE 3 and illustrates the wiper means operated by the cam which effectively extend the length of the trip arm when the smaller sized records are being played.

As described, baffle 132 is so dimensioned that it will pass beyond the prism 134 when the stylus has reached a position in the record play groove which is calculated to correspond to the end of the play groove in commonly available records, and particularly those of the larger size. However, in recent years manufacturers of small records, such as the 7" variety, have made it a practice to extend the play groove somewhat closer to the record center than is commonly practiced by the manufacturers of the larger size records in an effort to make greater utilization of the record surface area. The present invention provides means under the control of the cam by which the baffle 132 of the trip arm can be selectively lengthened to take care of those instances where the tone arm senses that the next record to be played is of the smaller 7" variety and having the play groove terminating closer to the record center. This means is illustrated in FIGURES 3 and 18 as comprising a shift lever 156 which is adapted to be operated by circular cam track 60, shown in FIGURE 8 as having a rise 154. The remaining portion of the cam track 60 being of substantially lower uniform height. As shown in FIGURE 3, shift lever 156 is disposed on the top side of the mounting plate 26 and is provided with an intermediately located right angular portion 158 which is pivotally connected to said mounting plate at 159. Overlying said part 158 is a spring 160 which is so tensioned as to constantly urge the shift lever 158 to assume a flat position against the upper surface of the mounting plate 26. One end of said shift lever comprises a portion 164 depending through a slot 166 in the mounting plate so as to comprise a follower in said track 60. The opposite end of said shift lever 156 comprises a part 168 extending through a further opening 170 in the mounting plate over the path of the baffle member 132 of the trip member 130. Said part 168 is provided with a wiping pad indicated at 172. And as shown in FIGURES 16 and 17, the trip member 130 is provided with an extension 176 shown pivotally connected thereto at 178 so that it is normally included within the periphery of the trip arm 130 but may be swung about connection 178 to assume a position extending rearwardly of the baffle 132 an amount limited by stop 177 abutting the edge of opening 179. As the cam 50 rotates, follower 164 rides in the cam track and as it engages rise 150 it is effectively rocked about pin 159 against spring 160 causing its opposite end 168 to dip momentarily downwardly into opening 170 so as to wipe pad 172 across the baffle 132, which is passing therebeneath as the tone arm moves inwardly to abut a record in the size sensing position under the control of roller 66 moving in track portion 56D. Rise 154 is so located along track 60 that it thus acts on shift lever 156 only when roller 66 has moved far enough into track portion 56D as to carry the tone arm beyond the point where it would engage a 10" record (FIG. 8) if supported at the record sensing position and immediately prior to where it would engage a 7" record supported at said position. Consequently in both instances when the tone arm is carried by roller 66 with rotation of the cam into abutment with the peripheral edge of the larger 10" and 12" records, baffle 132 is not moved far enough to have extension 176 affected by the wiper pad 172. However, in those instances where a 7" record is in the sensing position the roller 66 will carry the baffle 132 inwardly far enough so that at the moment the shift lever 156 has its end 168 depressed into opening 170 it will be so located that the pad 172 will wipe across and against the extension 176 so as to move it outwardly to the position indicated in dotted lines by FIGURE 18. Thereafter, when the 7" record has been lowered to the turntable and the stylus of the tone arm lowered to play the record, the now extended baffle 132 will allow the tone arm to move closer to the center of the record (by the amount of the extension) during its play before light will be able to pass from prism 134 to the photocell 136 to initiate rotation of the cam and the tone arm pickup. Also as shown in FIGURES 3 and 4, the works mounting plate is provided with a stop 180 against which the rear edge of the trip arm 130 engages each time it is moved outwardly by cam followed roller 66 acting in portion 56B of the cam track 56 and so acts as means to reset the extension member 176 within the confines of the trip arm at the beginning of each record change cycle so that the trip arm will then work normally for succeeding records until and unless the extension 176 is again tripped by pad 172.

The invention also provides means whereby once the last record has been lowered to the turntable and played the tone arm is automatically moved to a position beyond the periphery of the turntable where it is set down on the rest post 200 as the cam completes its rotation and is shut off. Referring therefore now to FIGURES 4 and 5, which are to be considered with FIGURES 8 and 9, cam track 56 is shown provided with an alternate or bypass indicated generally at 256 comprising an outwardly turned entrance portion 256A which communicates with the tone arm back-off cam track portion 56E, an outer concentric portion 256B which parallels concentric portion 56F and an inwardly turned exit portion 256C which enters into cam track portion 56G. The entrant portion 256A of said bypass is normally closed by a gate 210, shown pivotally mounted on cam 50 by pin 212. In the closed position of the gate, as illustrated by FIGURE 4, its leg 214 engages in a provided recess against stop 216 and its other leg 215 engages against stop 218 wherefore concentric curved side 220 of the gate 210 comprises the outer wall of cam track 56F. Gate 210, however, is provided with an upstanding tab or projection 222 on its leg 214 which as shown in FIGURE 9 protrudes above the surface of the cam 50 and so that it lies in the path of the trip arm 130 carried by the tone arm supporting yoke 30. The position of the cam 50 and the projection 222 on the gate, however, is so close to the center of rotation of the turntable that the trip arm 130 reaches said projecting tab 222 to trip the gate only under those circumstances where the tone arm has been moved inwardly by means of rollers 66 tracking in cam track portion 56D to substantially the inward end of said track portion 56D. When a record is positioned at the record sensing position of the center spindle, inward movement of the tone arm is halted by the tone arm abutting the edge of the record so that the gate is not tripped. However, after the last record has been lowered to the turntable and the cam reenergized by the tone arm moving into the center of the turntable at the end of record play, the record supporting fingers 42 and the tone arm are again raised and moved laterally under the control of cam tracks 48, 58 and 56 respectively, as described above. However, this time the roller 66 will cause the tone arm clutched to cam follower 68 to be carried inwardly to substantially adjacent the center spindle without engaging a record at the record size sensing position. Accordingly, as the roller 66 reaches the inner end of cam track portion 56D its cam follower 68 will have carried the tone arm assembly clutched thereto far enough inwardly to have caused the trip arm 130 to engage the projecting tab 222 and trip gate 210 with the aid of toggle spring 229 and plate 227 to hold gate 210 to its open position, as shown in FIGURE 8. Leg 214 of gate 210 now being positioned within recess 224 bars the entrance of the roller 66 into the concentric cam track portion 56F and wherefore it is guided by cam track portion 56E and the adjacent surface of the gate leg 214 into the entrance portion 256A of the bypass track so that the tone arm is carried in an outward direction beyond the periphery of the turntable and to a position over the rest post 200 as is illustrated by FIGURE 1. As the cam continues to rotate so as to allow the fingers 42 under the control of bell crank 44 to complete their cycle of being lowered from the size sensing portion into the turntable and then returned to their upper position at the top of the spindle, roller 66 will simultaneously enter outer concentric portion 256B to hold the tone arm clear of the turntable, after which roller 66 will be guided by exit track portion 256C to return to portion 56G and its starting position at 66A.

Figure 19:
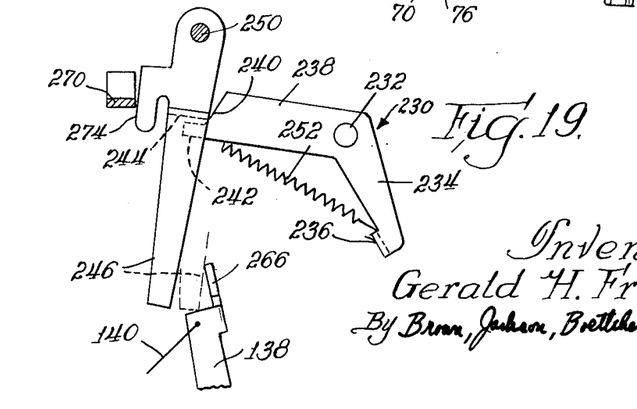
FIGURE 19 is a fragmented view illustrating details of the turntable motor shut off mechanism.

The invention also provides means such that as the roller 66 is returned to its starting position 66A by cam track portion 256C the tone arm is locked at said position over the rest post 200, clutch 70 slipping so that the tone arm does not move back therewith to a position over the turntable. This means is illustrated in FIGURES 8, 5 and 19. Referring first to FIGURE 8, cam 50 is shown provided with a flexible wire like member 226 pivotally mounted on the top side of the cam 50 as by pin 228 and that flexible member 226 is normally wholly within the periphery of the cam and has an intermediate portion thereof in concentric cam track portion 256B. Referring still to FIGURE 5 and also FIG. 19, at 230 is an operating bell crank pivotally connected intermediate its two legs as by pin 232 to the underside of the works mounting plate 26. Operating member 230 includes a first leg 234 having a depending portion 236 disposed adjacent the outer periphery of the cam 50. It also includes a second leg 238 having a sloping end surface 240 and a forward projection 242. At 246 is a lock member disposed on the underside of mounting plate 26 and having a vertically extending portion 244 extending upwardly through a provided opening 248 in the works mounting plate 26 and its opposite end connected by pin 250 to the upper side of the works mounting plate 26. Said sloping surface 240 and projection 242 of member 230 provide a recess in which the upstanding portion 244 of lock member 246 is operatively engaged. Connected between upstanding portion 236 of the operating member 230 and to the free end of the lock member 246 is a spring 252. Therefore now referring back to FIGURE 8 and considering the same with FIGURE 19, it will be appreciated that as roller 66 moves from entrance portion 256A into concentric portion 256B of the bypass with rotation of the cam, it first engages leg 215 of the gate 210 so as to toggle the gate and be held in its normally closed position by spring 229 and as the cam continues to rotate next engages flexible member 226 so as to displace its end 260 outwardly beyond the perhiphery of the cam to the position indicated by phantom lines in said FIGURE 8. Operating member 230 is so located that as this occurs, end 260 of flexible member 226 now backed by roller 66 engages the upstanding portion end 236 of the operating member 230 so as to rotate it in a counterclockwise direction as illustrated in FIGURE 5, causing spring 252 to rotate lock member 240 in a similar counterclockwise direction about its pivotal connection at 250 to carry the vertical upstanding portion 244 thereof into notch 262 provided in the trip arm 130 of the tone arm assembly which is aligned to receive the upstanding portion 244 of the locking member 246. As the cam continues to rotate, roller 66 passes beyond the flexible member 226 so that it no longer affords resistance thereto and it returns to its position within the periphery of the cam. However, spring 252 continues to retain vertical upstanding portion 244 of the locking member 246 within the recess or cut-out 262 of the tone arm trip arm 130. The tone arm is therefore locked in its position over the rest post and does not follow the inward movement of roller under the guidance of track 256C, the locked tone arm causing clutch 70 to slip. Referring now to FIGURE 5, it will be seen that the shutter operating shift member 138 having portion 144 which rides on cam track 64 comprising the outer periphery of the cam 50 includes an upstanding portion 266 on its outer or free end. When spring 252 swings locking member 246 about its pivotal connection 250 to lock the tone arm trip arm 130 in place, it also moves the outer free end of the lock member 246 against said upstanding portion 266. Consequently, as the cam completes a full turn and projection 64B engages portion 144 of said shift lever to move it radially outwardly away from the center of rotation of the cam, shift lever 138 also acts on the free end of the locking member 246 by rotating it in a clockwise direction against the pull of spring 252 so as to disengage its vertical portion 244 from cutout 262 in the tone arm trip arm 130. Thereafter, rock arm 78 having moved up slope 97 in the cam track 58, the tone arm lowers into position on the rest post 200. Also shown in FIGURE 5 is a switch actuating member 270 resting on a ledge 272. Member 270 constitutes a turntable operating switch member which is engaged by the lock means 246 as it is moved in a clockwise direction about its pivotal connection 250 under the action of upstanding portion 266 so that it is also actuatable by lever 138 acting on lock member 246 to not only release the tone arm for lowering into a position on the rest post 200 but also to actuate turntable motor switch member 270 so that the player is shut off.

Therefore to briefly review, it will be recognized that the several described tracks on cam 50 and the mechanisms which are operated thereby act in conjunction so that when the cam motor 54 is initially energized and/or at the end of play of a record the tone arm is raised from position 1 on the record adjacent the center spindle to position 2 by means of rock arm 78 operating through its end 84 in cam track 56 and in cooperation with spring 90. Rocker arm 78 simultaneously clutches cam follower 68 to the tone arm assembly yoke 30 by means 70 so that cam track 56 then operates on the tone arm through cam follower 68 to first move the tone arm outwardly to position 3 which is to allow the bottom record of a stack to be lowered by operation of bell crank 44 in track 48 to the sensing position. Thereafter the tone arm is moved inwardly until at 4 it abuts the edge of a record held at the sensing position, thereafter it backs the tone arm off from the record to position 5 which is far enough to allow the primary record supporting fingers 42 under the control of cam track 48 to be lowered the rest of the way to the turntable and then to be raised to their normal position of supporting the record back at the top of the spindle. Thereafter the cam 50 operating through cam track 56 causes the cam follower 68 to move the tone arm inwardly a controlled increment to position 6 where its stylus is located over the starting record of the groove after which the cam completes its full turn and the rocker arm 78 causes the tone arm to be lowered to its play position at 7. The cam then shuts off and is not restarted until the tone arm has been moved inwardly to its position 1 at the end of play which causes the cycle to be repeated. When the tone arm is moved from position 5 by the action of cam follower in track 56D, but without engaging the edge of a record at the record sensing position, as will happen in the succeeding cycle after the last record has been played, then roller 66 of the cam follower 68 is caused to enter a bypass track 256 by which it carries the tone arm outwardly to position 8. While holding the tone arm in said rest position, the cam also operates locking means 246 through flexible member 226 and operating crank lever 230 to hold the tone arm in said position outside the periphery of the record until the end of the change cycle and so that as rise 86 in track 58 engages rock arm 78, the tone arm will be lowered to rest post 200 after which shift lever 138 operates to shut off the turntable motor as it also turns off the cam motor, leaving the player in a completely deactivated position. The cam also includes a track 60 which operates a lever 156 in sequence so that whenever a 7" record is in the sensing position it readjusts the length of the baffle 132 on the trip arm of the tone arm to compensate for the extra length of record playing groove provided on such smaller size records. The cam also includes a cam track 62 which operates a brake 124 so that rotation of the turntable is stopped during the interval of lowering a record thereto.

Thus from the above description of an embodiment of the invention, it will be appreciated that all of the recited objects and advantages and features thereof have been demonstrated as being obtainable in an entirely practical and highly efficient and effective manner.

Thus having described my invention, I claim:

1. In a record player having a turntable for rotating records to be played, the combination of means for sequentially releasing records one at a time to the turntable, a tone arm for playing each record released to the turntable as it is rotated thereby, control means for moving the tone arm off the record at the end of each record play and into abutment with the peripheral edge of the record next to be released to the turntable, the control means moving the tone arm inwardly to the center of the turntable in the absence of a record in position to be abutted by the tone arm, an abutment carried by the tone arm, and means positioned to be actuated by said abutment of the tone arm when thus moved inwardly to the center of the turntable causing the control means to move the tone arm to a rest position beyond the turntable, and means releasably locking the tone arm in said rest position.

2. In a record player as claimed in claim 1, the combination further including means for temporarily stopping rotation of the turntable during the releasing of each record thereto.

3. In a record player as claimed in claim 2, wherein the record release means, tone arm moving means and turntable stopping means are operated by a single cam which is energized to turn through one revolution at the end of each record play.

4. In a record player, the combination of a rotatable turntable, record supporting means adapted for sequentially lowering records one at a time to an intermediate height over the turntable and then to deposit the record on the turntable, a tone arm for playing each record when lowered to the turntable and rotated thereby, the tone arm moving toward the center of the turntable during record play, a rotatable cam and actuating means energized by movement of the tone arm into a position adjacent the center of the turntable at the end of record play which rotates the cam through a required turn, first means operated by rotation of said cam for raising the tone arm to said intermediate height as the cam starts to rotate and to lower the tone arm as the cam completes said turn, second means operated by rotation of said cam which first moves the tone arm outwardly of the record after it has been raised by said first means and then moves the tone arm inwardly after the record has been lowered by the record engaging means to said intermediate height, said second means moving the tone arm inwardly toward the turntable center until it abuts a record at said intermediate height and after the record has been deposited on the turntable moving the tone arm a controlled increment so as to locate the tone arm for playing the record when thereafter lowered to the turntable, triggering means which move with the tone arm, the cam having further means which are actuated by said triggering means when the tone arm is moved to adjacent the turntable center in the absence of the tone arm abutting a record at said intermediate height, said further means causing the second means to move the tone arm outwardly to a rest position beyond the turntable, and means actuated by the second means which releasably lock the tone arm in said rest position as the cam continues to rotate to complete its turn.

5. In a record player, the combination of claim 4 further including means operated by the cam which brake rotation of the turntable as the record is deposited by the record supporting means to the turntable.

6. The combination of claim 4 further including a cam follower, and means which clutch said cam follower to the tone arm only during rotation of the cam so that the tone arm moves under the control of the cam, and is free of the cam to follow the groove of a record rotating on the turntable during record play.

7. The combination of claim 4 wherein the tone arm is provided with means for initiating rotation of the cam when the tone arm has been moved to adjacent the center of the turntable at the end of record play, and the cam includes means for stopping its rotation after it has been turned through a required angle to effect the record change cycle.

8. In a record player having a rotatable turntable, record supporting means adapted for sequentially lowering records one at a time to an intermediate height over the turntable and then to deposit the record on the turntable, a tone arm for playing each record when lowered to the turntable and rotated thereby, the tone arm moving toward the center of the turntable during record play, a rotatable cam and actuating means energized by movement of the tone arm into a position adjacent the center of the turntable at the end of record play which rotates the cam through a required turn, first means operated by rotation of said cam for raising the tone arm to said intermediate height as the cam starts to rotate and to lower the tone arm as the cam completes said turn, second means operated by rotation of said cam which first moves the tone arm outwardly of the record after it has been raised by said first means and then moves the tone arm inwardly after the record has been lowered by the record engaging means to said intermediate height, said second means moving the tone arm inwardly toward the turntable center until it abuts a record at said intermediate height and after the record has been deposited on the turntable moving the tone arm a controlled increment so as to locate the tone arm for playing the record when thereafter lowered to the turntable, the cam having further means which act on said second means when the tone arm is moved to adjacent the turntable center in the absence of the tone arm abutting a record at said intermediate height, said further means causing the second means to move the tone arm outwardly to a rest position beyond the turntable, and means actuated by the second means which releasably lock the tone arm into said rest position as the cam continues to rotate to complete its turn, the combination therewith wherein the tone arm is provided with means for initiating rotation of the cam when the tone arm has been moved to adjacent the center of the turntable at the end of record play, the cam including means for stopping its rotation after it has been turned through a required angle to effect the record change cycle, and said tone arm has further means operable by the cam to change the distance from the center of the turntable at which the tone arm means will next initiate rotation of the cam.

9. The combination of claim 8 wherein the further means of the tone arm is selectively operable by the cam only when the tone arm is moved inwardly of the turntable to abut the peripheral edge of a small-sized record.

10. In a record player, the combination of a rotatable turntable, first means adapted for sequentially depositing records one at a time onto the turntable, and a tone arm for playing each record when deposited on the turntable and rotated thereby, the tone arm moving inwardly toward the center of the turntable when playing a record, a rotatable cam and actuating means energized by said inward movement of the tone arm for rotating said cam through one full turn after each record deposited on the turntable has been played by the tone arm, lift means operated by said cam for raising the tone arm to a height above the turntable when the cam starts to rotate and to lower the tone arm when the cam completes its full turn, control means actuated by said lift means operatively connecting the tone arm to the cam such that rotation of the cam first moves the tone arm outwardly of the turntable after it has been raised by operation of the lift means and then moves the tone arm inwardly toward the turntable center to abut the next record to be played, the cam having further means which cause the control means to thereafter locate the tone arm in a starting position over the thus abutted record after it has been deposited by the first means onto the turntable, the cam having means alternate to said further means which cause the control means to move the tone arm outwardly to a position beyond the turntable, and triggering means positioned to actuate said alternate means when the tone arm is moved by the control means to adjacent the turntable center in the absence of the tone arm abutting a record, and locking means for releasably locking the tone arm when moved outwardly to said position.

11. The combination of claim 10 wherein the cam includes means for releasing said locking means as the cam completes a full turn so that the tone arm is lowered by the lift means to a position of rest outside the turntable.

12. In a record player, the combination of a rotatable turntable, first means adapted for sequentially depositing records one at a time to the turntable for rotation thereby, a tone arm having a stylus for playing each record as it is rotated by the turntable, a rotatable cam having a non-circular continuous track about its axis of rotation, a cam follower following in said track, and means for frictionally clutching the follower to the tone arm as the cam starts to rotate and to declutch the follower as the cam completes one full turn, said cam track as the cam is rotated causing said follower through the clutch means to move the tone arm outwardly of the periphery of the turntable and then inwardly toward the center of the turntable until it abuts the periphery of a record held by the first means over the turntable, the cam track continuing to move the follower inwardly toward its center a distance sufficient to carry the tone arm into abutment with the edge of the smallest size record to be played on the record changer, the clutch means slipping as the tone arm abuts a record, said cam having an alternate path for said follower, and means causing said follower to enter said alternate path when the tone arm is carried a predetermined distance inwardly to the center of the turntable in the absence of a record positioned to be abutted by the tone arm, the follower when in said alternate path being caused by rotation of the cam to carry the tone arm to a position outwardly of the turntable, and means positioned to be actuated by the follower moving in said alternate path for releasably locking the tone arm in said outward position, the follower being moved inwardly by said alternate path with continued rotation of the cam to return the follower to its starting position in the continuous non-circular track.

13. The combination of claim 12 wherein the cam includes actuating means for stopping rotation of the cam as it completes a full turn and returns the follower to its starting position in the continuous track, said actuating means acting to release said locking means and to shut off the changer.

14. In a record player having a turntable, lowering means adapted for lowering a record from an overhead storage position to an intermediate size sensing position before releasing it to the turntable for playing, and a tone arm having one end provided with a stylus which tracks in the groove of a released record on the turntable and moves with rotation thereof toward the center during record play, the combination therewith of a rotatable cam having a non-circular continuous track spaced about the axis on which the cam rotates, means initiating rotation of said cam through one full turn in response to movement of the tone arm to adjacent the center of the turntable at the end of a record play, a follower following in said cam track, lift means initiated by rotation of the cam for raising the tone arm above the turntable to a height corresponding to the size sensing position of the record, said lift means including a clutch for clutching the follower to the tone arm when initiated by said rotation of the cam such that the tone arm will move therewith during rotation of the cam, said cam track having a first portion which is directed away from the cam axis and a second portion directed toward the carry the tone arm clutched thereto to outside the periphery of the turntable a distance sufficient to permit a record to be lowered to its size sensing position, said second portion of the cam track causing the follower to be carried inwardly of the cam a distance sufficient to carry the tone arm to adjacent the central axis of the turntable, said clutch slipping when the tone arm abuts the edge of a record in said size sensing position and the follower continues to be carried to the inner end of said second portion of the cam track, said cam track having a third portion which causes the follower through the clutch to back the tone arm outwardly a controlled increment and a fourth portion which causes the follower through the clutch to move the tone arm again toward the center of the turntable a controlled increment after the record has been released by the lowering means from the size sensing position to the turntable, said last mentioned fourth portion being adjacent the start of the first portion of the cam track such that the tone arm is properly located over the starting groove of the released record on the turntable, when the cam has completed its full turn, and said lift means being adapted to lower the tone arm to the released record on the turntable and simultaneously release said clutch as the cam completes its full turn and stops whereby the tone arm is free to follow in the groove of the released record during its play.

15. The combination in a record player as claimed in claim 14 wherein the cam includes a second cam track adjacent the end of the second portion of the first cam track, the cam having gate means actuated by the tone arm when it is carried to the center of the turntable by said second portion of the cam track in the absence of a record in the size sensing position which cause the follower to move into the alternate track, said alternate track being adapted to carry the follower outwardly to the edge of the cam so as to move the tone arm to a rest position outside the periphery of the turntable and then return the follower to the starting position so as to bypass said fourth cam track portion, the follower as it enters the alternate track acting to reset the gate to its normal position, and actuating means positioned to be engaged by the follower as it moves through said alternate track, said actuating means when engaged by the follower serving to actuate means locking the tone arm in its outer position as the follower is returned by the alternate track to the start of the first portion of the first cam track.

16. The combination of claim 15 having means for stopping rotation of the cam as it completes a full turn, said stopping means when actuated also acting to release said locking means so as to allow the tone arm to be lowered by the lift means to a position of rest on the record changer.

17. The combination of claim 14 further including trip means actuated by the cam and operating on means carried by the tone arm for initiating rotation of the cam at the end of record play, said trip means acting on the tone arm to alter the distance from the center of the turntable at which the tone arm initiates rotation of the cam.

18. The combination of claim 17 wherein said trip means including a pivoted lever having one end following in a third cam track on the cam, said third cam track having a portion located to rock said lever when the tone arm has been moved by the follower in the second portion of the first cam track to a predetermined distance from the turntable center.

19. The combination of claim 18 further including a fourth cam track on said cam and a brake setting lever operated by a portion of said fourth cam track to brake the turntable, said portion being located so as to halt rotation of the turntable as a record is released to the turntable by the record lowering means.

20. The combination of claim 14 wherein the lift means includes a rocker arm, a friction clutch mounted on one end of said rocker arm and connected to said follower, spring means biasing said end of the rocker arm and thereby the clutch mounted thereon toward the tone arm support, and means on the cam which act on the rocker arm to hold the clutch out of engagement with the tone arm against the biasing of said spring means.

21. The combination of claim 20 further including a lift plate mounted on said rocker arm so as to be elevatable therewith and also elevatable independently thereof to effect raising the tone arm.

22. In a record player, the combination of a rotatable turntable, means for lowering one of a group of records from an overhead storage position to the turntable, means for moving the tone arm off each record at the end of play and returning it to play position on the next record lowered to the turntable, and a rotatable cam having means for coordinating the operation of said record lowering means and tone arm moving means, operating means including a switch for rotating said cam, the tone arm having a trip portion which trips said switch to effect rotation of the cam when the tone arm has been moved to within a given distance from the center of the turntable at the end of record play, and means operated by the cam for altering said distance from the center of the turntable at which the trip portion of the tone arm will next trip said switch to initiate rotation of the cam to end record play and initiate a record change cycle.

23. In a record player, the combination of a rotatable turntable, means for sequentially releasing records one at a time to the turntable for rotation thereby, a tone arm adapted to be moved laterally of the turntable so as to play each record lowered to the turntable and as it is rotated thereby, a rotatable cam, a follower and means for clutching said follower to the cam to effect moving the tone arm off the turntable to permit releasing the next record thereto and then returning the tone arm to the released record in proper position for playing thereof, the last mentioned means including a rocker arm operated by the cam to raise the tone arm, a clutch supported on one end of said rocker arm and connected to the follower, resilient means for biasing said one end of the rocker arm and thereby the clutch into frictional clutching engagement with the tone arm when the rocker arm is operated to raise the tone arm, and means on the cam which cause said rocker arm to lower the tone arm and resist said biasing means so as to hold the clutch out of engagement with the tone arm while the tone arm is playing a record as it is rotated by the turntable.

24. The combination of claim 23 further including a lift member supported on said free end of the rocker arm so as to be elevatable with the rocker arm and also independently thereof, said lift member when elevated serving to raise the tone arm through a plane parallel to the axes on which the turntable rotates records released thereto.

25. In a record player, the combination of a rotatable drive member, a turntable removably mounted on said drive member to rotate therewith, means for lowering one of a group of records to the turntable from an overhead storage position, a tone arm for playing each record released to the turntable as it is rotated thereby and a cycling cam adapted to rotate through one full turn at the end of record play by the tone arm, control means adapted to be operated by said cam for moving the tone arm off each record at the end of record play, lowering a new record to the turntable and thereafter setting the tone arm into play initiating position on the new record, a pivotally mounted lever having one end adapted to frictionally engage said drive wheel and abutment means on said cam positioned to engage said other end of the lever so as to pivot said lever and hold said first end thereof in positive frictional engagement with said drive wheel to halt rotation of the turntable, said abutment comprising an angular portion of the rotation of the cam such that the abutment engages the lever during the lowering of the new record to the turntable and moves beyond said end of the lever after the record has been released in order to permit the turntable to resume rotation prior to the setting of the tone arm into playing position on the new record.

References Cited

UNITED STATES PATENTS

| | | | |
|---|---|---|---|
| 2,818,263 | 12/1957 | Dale | 274—10 |
| 3,012,789 | 12/1961 | Rae | 274—10 |
| 3,044,782 | 7/1962 | Hansen | 274—10 |
| 3,254,896 | 6/1966 | Dennis | 274—10 |
| 3,305,238 | 2/1967 | Carlson | 274—10 |
| 3,379,442 | 4/1968 | Tatter et al. | 274—10 |

HARRY N. HAROIAN, Primary Examiner